Feb. 15, 1966 W. S. HARRIS 3,235,408
AMMONIA ELECTRIC CURRENT-PRODUCING CELL
Original Filed March 10, 1961

INVENTOR:
WILLIAM S. HARRIS

United States Patent Office 3,235,408
Patented Feb. 15, 1966

3,235,408
AMMONIA ELECTRIC CURRENT-PRODUCING CELL
William S. Harris, Corona, Calif., assignor to G. & W. H. Corson, Incorporated, Plymouth Meeting, Pa., a corporation of Delaware
Continuation of application Ser. No. 94,821, Mar. 10, 1961. This application Oct. 18, 1963, Ser. No. 317,303
14 Claims. (Cl. 136—90)

The present application is a continuation of my application Serial No. 94,821, filed March 10, 1961, now abandoned.

The present invention relates to a novel electric current-producing cell, and to a novel method of generating electric current using the same; and, more particularly, the invention relates to an improved electric current-producing cell system embodying an electrolyte in which the principal solvent is liquid ammonia instead of water as is the case in conventional electric current-producing cells. The invention also relates to a battery comprising two or more of such simple cells.

The electric current-producing cells and batteries in general use for years down to the present day utilize an aqueous solution of some acid, base or salt as an electrolyte. These cells and batteries perform under standard conditions of atmospheric pressure and temperature, and most of them can be stored for reasonable periods of time without deterioration. The effect of increasing the temperature in storage tends, in general, to reduce the shelf life of these cells and batteries. Reduction in temperature below freezing causes them to become inoperative. The chief reason for this inoperative characteristic of conventional cells and batteries at low temperatures is the electrolyte employed. While the introduction of certain solutes can be used to lower the freezing point of the aqueous electrolyte, it is still impossible to obtain good cell characteristics in these cells at temperatures very much below the freezing point of water. In the case where temperatures greatly below the freezing point of water are encountered, the conventional aqueous type cell will not operate. The conventional aqueous cell systems, therefore, possess limitations which render them unsatisfactory for operation at low temperatures as encountered for example, in arctic regions or at high altitudes.

Because of the limitations of aqueous cell systems there have been attempts to prepare cell systems in which the principal solvent for the electrolyte has been one or another organic liquid, such as pyridine, methane amide, methyl acetate, methanol, and the like. However, any advantage gained through the use of such liquids has been small relative to the limitations and the disadvantageous encountered, and these systems have never achieved any commercial success.

In U.S. Patents Number 2,863,933 and 2,937,219 are disclosed and claimed cell systems in which the electrolyte solvent is liquid ammonia. In the cell system of Patent 2,863,933 the anode comprises an electropositive metal, the anolyte comprises a salt dissolved in the liquid ammonia, the cation of which corresponds to the electropositive metal of the anode, and the catholyte comprises an ammonium and/or metal salt dissolved in the liquid ammonia the metal cation of which develops an electrolytic potential in liquid ammonia at least 0.75 volt less than that developed by the metal of the anode in liquid ammonia.

The cell system of Patent 2,937,219 comprises an anode, a depolarizing cathode and an electrolyte comprising liquid ammonia having material dissolved and ionized therein to render it electrically conductive, at least the anolyte portion of which comprises ammonium ions.

In copending application Serial No. 658,311, now Patent No. 2,992,289, filed May 10, 1957, are disclosed and claimed a vapor-activatable cell comprising a cell compartment and, within the cell compartment, an anode, a cathode and electrolyte solute by itself substantially inactive to generate current with said anode and cathode, and means for introducing ammonia in the vapor state to the compartment for contact with the solute to form active electrolyte.

It is the principal object of the present invention to provide a novel electric current-producing cell of the ammonia system in which the electrolyte solvent is liquid ammonia.

A further object of the invention is to provide an improved electric current-producing cell system of the ammonia type as disclosed and claimed in the foregoing patents and copending application.

Still another object of the invention is to provide an improved electric current-producing cell of the ammonia system which possesses high capacity.

Still another object of the invention is to provide a novel method of generating electric current by chemical means with the ammonia system.

Other objects, including the provision of a novel electric current-producing battery possessing the herein-mentioned features, will become apparent from a consideration of the following specification and claims.

Before discussing the present cell in detail, it will be helpful to consider the nature of liquid ammonia and of the liquid ammonia system. Under ordinary atmospheric conditions ammonia is a colorless gas. Upon cooling, however, under one atmosphere pressure, this gas can be converted to a liquid at about −33° C. Liquid ammonia freezes at about −77° C. Theoretically, liquid ammonia ionizes mainly into the ammonium ($NH_4^+$) ion and amide ($NH_2^-$), imide ($NH^=$) and nitride ($N^\equiv$) ions, the ammonium ions corresponding to the hydrogen ions of the aqueous system and the amide, imide and nitride ions corresponding to the hydroxyl ions of the aqueous system. However, as a practical matter, liquid ammonia does not ionize measurably. Under present day chemical terminology, the names of classes of inorganic compounds are based on the aqueous system. In other words, ammonium hydroxide is normally considered to be a base while ammonium compounds produced, for example, by the neutralization of ammonium hydroxide with an acid, are normally considered to be salts. It will be seen that in the liquid ammonia system, conventional terminology may be misleading in that, in the liquid ammonia system, ammonium compounds provide ammonium ions and hence ammonium hydroxide is actually a weak acid with respect to liquid ammonia, and ammonium salts, such as ammonium thiocyanate, are actually strong acids. Water, since it forms ammonium ions in the liquid ammonia system, functions as a weak acid. The addition of water to liquid ammonia is similar to adding ammonium hydroxide. By the same token the addition of an acid (HA) results in the formation of ammonium ions and hence produces acidity ($NH_4A$) in the liquid ammonia system. The bases in the liquid ammonia system, the amides, imides and nitrides, are in general insufficiently soluble for practical electrolyte compositions. There are many analogies between the function of ordinary metal salts in liquid ammonia and their function in water. It will be seen, however, that in electrolytes wherein liquid ammonia is the principal solvent, "acidity" or "neutrality" may be controlled by the addition of ammonium compounds, water or acid, on the one hand, or of amides, etc. on the other. Herein, reference is made to ammonium compounds, that is hydroxide or salts, in accordance with conventional terminology in spite of the fact that, in the liquid ammonia system, they are the acids.

Liquid ammonia by itself is not sufficiently conductive to serve as an electrolyte in an electric current-producing cell. As in the case of water in the aqueous cell systems, material freely ionizable in the solvent, ammonia, must be dissolved in the liquid ammonia in order to render it sufficiently conductive.

As in aqueous cell systems, polarization of the cathode presents problems in ammonia cell systems. By "polarization" is meant the formation, at the cathode, of hydrogen or other reaction products which tend to raise the cathode potential and/or produce loss of contact between the cathode conductor and the electrolyte. The prevention of this phenomenon is termed "depolarization." Depolarization can be accomplished by physical means, based on the ability of hydrogen to diffuse through solid materials, or by chemical means through the use of a material, in contact with the cathode conductor, which reacts with polarizing products thereby preventing or minimizing their formation. The materials most often used heretofore for this purpose in ammonia cell systems have been lead or manganese dioxide.

It has been found that aromatic organic compounds having at least one $—NO_x$ group (where $x$ is 1 or 2) attached directly to a ring carbon atom of the aromatic compound serve as excellent depolarizers in the ammonia cell system and are devoid of the above-mentioned limitations. The $—NO_x$-substituted aromatic compound may be employed as the sole depolarizer or may be used in conjunction with other depolarizing materials. It has also been found that the $—NO_x$-substituted aromatic compound may also serve as electrolyte solute imparting electrical conductivity to the liquid ammonia so that it can serve as the sole electrolyte solute or may be used in conjunction with other solutes in the liquid ammonia system. The improvement through the use of an $—NO_x$-substituted aromatic compound in accordance with the present invention manifests itself largely through greater operating capacity of the cell.

The improvement of the present invention, therefore, comprises, in the ammonia electric current-producing cell system involving an anode, a cathode conductor and electrolyte in which liquid ammonia is the solvent, an aromatic organic compound having at least one $—NO_x$ group, where $x$ is an integer selected from 1 and 2, attached directly to a ring carbon atom of the aromatic compound, in contact with the cathode conductor.

For brevity herein the stated aromatic compound will be referred to simply as the $—NO_x$-substituted aromatic compound.

For illustration of cells of the present invention reference may be had to the drawings in which.

Figure 1:
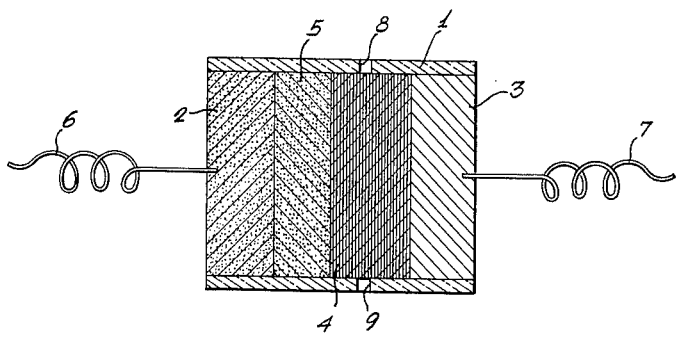
FIGURE 1 represents, schematically, a side elevational, sectional view of one form of cell of the present invention.

Referring to the $—NO_x$-substituted aromatic compound, it may be any aromatic organic compound, such as a benzene, naphthalene, biphenyl, anthracene, or the like, containing at least one $—NO_x$ group attached directly to a ring carbon atom of the aromatic nucleus. In the formula $—NO_x$, $x$ is either 1, in which case the group is a nitroso group ($—N=O$), or 2, in which case the group is a nitro group ($—NO_2$). When more than one such $—NO_x$ group is present each will, of course, be directly attached to different ring carbon atoms, preferably non-adjacent ring carbon atoms, and each $—NO_x$ group on the compound may be the same or different. Generally, there will be no more than four $—NO_x$ groups present, and the preferred compounds contain 2 or 3 $—NO_x$ groups.

As is known, nitro groups attached to ring carbon atoms can be reduced progressively through nitroso to amino. In the operation of the cell of the present invention, it is believed that similar reduction occurs. Furthermore, since the nitroso group is reducible as is the nitro group, the nitroso group and the nitro group function similarly, the former being one stage further along in the reduction sequence than is the latter.

In the $—NO_x$-substituted aromatic compounds, the nuclear hydrogens of the aromatic nucleus may be replaced by alkyl, alkoxy, carboxyl, cycloalkyl, aryl, arylalkyl, halogen, amine, and the like groups. Compounds having substituents on the aromatic nucleus in addition to the $—NO_x$-group or groups have been found to be useful in accordance with the present invention, and, as far as is presently known, there is no limitation as to the character of the substituents, other than the $—NO_x$ group or groups, and they may be organic or inorganic in nature, although individual substituents may affect in degree the operating characteristics of the cell. Hence, where reference is made herein to $—NO_x$-substituted "aromatic compound," "benzene," "naphthalenes," etc., it will be understood such substituted derivatives as well as unsubstituted (except for the $—NO_x$ group or groups) compounds, unless otherwise specified. The presently preferred compounds are the di- and trinitrobenzenes.

Examples of $—NO_x$-substituted aromatic compounds are: nitrobenzene, o-chloronitrobenzene, m-nitrophenol, o-nitrotoluene, p-nitrooxylene, β-nitronaphthalene, nitronaphthoic acid, nitronaphthol, nitroanthracene, m-dinitrobenzene, 3,5-dinitrobenzoic acid, p-dinitrotoluene, 1,3,5-dinitrochlorobenzene, 1,3-dinitronaphthalene, 1,4-dinitronaphthalene, 2,4-α-dinitronaphthol, β-dinitroanthraquinone, 1,3,5-trinitrobenzene, 2,4,6-trinitrotoluene, picric acid, 2,4,6,1,3 - trinitroxylene, 1,3,5 - trinitronaphthalene, nitrosobenzene, p-nitrosotoluene, 2-nitrosoparacymene, 4-chloronitrosobenzene, 4-methoxynitrosobenzene, 2-benzylnitrosobenzene, 3,5-dicyclohexylnitrosobenzene, N,N-dimethyl-p-nitrosoaniline, 2-methylnitrosonaphthalene, 1-ethyl-5-butylnitrosonaphthalene, 2,5-dinitrosoparacymene, 5-chloro-1,3-dinitrosobenzene, 2,5-dibenzyl-1,3-dinitrosobenzene, 2,4,5-trichloro - 1,3 - dinitrosobenzene, 1,4-dinitrosonaphthalene, 2 - ethoxy - 1,5 - dinitrosonaphthalene, 1,4,5-trichloro-2,7-dinitrosonaphthalene, and the like.

Referring to the electrolyte, as stated, the $—NO_x$-substituted aromatic compound may be the sole solute for the electrolyte in which case the electrolyte is liquid ammonia containing the $—NO_x$-substituted aromatic compound. Most often the $—NO_x$-substituted aromatic compound is confined to the cathode section, and, when an $—NO_x$-substituted aromatic compound is the sole solute for the catholyte, the catholyte will be liquid ammonia containing the $—NO_x$-substituted aromatic compound. However, benefits of the present invention may also be realized when other solute is used in conjunction with the $—NO_x$-substituted aromatic compound. Despite the absence of abnormal proton mobility, in general, "acid" liquid ammonia electrolytes, demonstrate high conductivity. As stated, ammonium hydroxide and ammonium salts are "acids" in the liquid ammonia system. Hence, any ammonium salt soluble in liquid ammonia at least to the extent hereinafter discussed or any compound which forms with the ammonia either ammonium hydroxide or an ammonium salt in solution therein to a concentration hereinafter discussed, may be employed as part of the solute along with the $—NO_x$-substituted aromatic compound. A metal salt or salts may be employed, in which case the cation will generally be a metal above iron in the electro-chemical series, particularly lithium, sodium, potassium, caesium, rubidium, calcium, strontium, barium, magnesium, zinc, aluminum, beryllium, manganese, and the like. Salts of the alkali and alkaline earth metals, especially salts of lithium, potassium, calcium and magnesium, and zinc salts are particularly preferred. The cation of the metal salt will be more electropositive than the metal of the anode. Of all the salts, the ammonium salts, lithium salts and potassium salts have been found to be particularly advantageous. With respect to the anion of the salts, the thiocyanates, perchlorates and nitrates are particularly advantageous. These salts are freely soluble in liquid ammonia. Other salts that may be mentioned as being applicable are the cyanides, chlorides, cyanates, fluoborates, iodides, nitrites, and the like.

The acidity that can be tolerated in any particular cell system may be limited by the nature of the other components of the cell, particularly the anode. As will be pointed out more in detail hereinafter, in some situations care must be exercised in controlling the acidity of the electrolyte to avoid undue local action at the anode. Hence, the requisite conductivity of the electrolyte may be provided in part by metal salts, which, in the ammonia system, are more or less neutral.

At any rate, the ammonium ion concentration at the anode upon dissolution of the solute in the ammonia should be such as to produce an ammonium electrode potential which is to some extent dependent upon the anode potential. The exact difference between the ammonium electrode potential and the anode potential will depend primarily upon the characteristics desired in the cell as determined by the proposed application. For example, if it is desired that the cell possess a long shelf life after activation, the difference between the two potentials will normally be less than in the case of a cell in which a short useful life after activation is required. The greater the ammonium electrode potential is below (more noble) the anode potential, the greater the tendency for deterioration, by chemical action, of the anode.

Since the anode may favor one set of conditions, e.g. low acidity, and the cathode may favor another set of conditions, e.g. high acidity, the solute employed may often be a compromise between these two extreme considerations. On the other hand, the cell compartment may actually be divided into two separate sections namely, an anode section and a cathode section, with differing solutes in each, the two sections being separated by a porous or permeable diaphragm. In such case, separate electrolyte portions will be formed, namely, an anolyte and a catholyte.

There are other factors which also determine the amount of solute dissolved in the liquid ammonia to provide the electrolyte. One of the primary considerations in this connection is the temperature under which the cell is designed to operate. In general, the conductivity of the electrolyte decreases with decreasing temperature. For any given solute at any particular temperature, there is an optimum concentration of solute to provide optimum concentration, the conductivity falls off. In other words, by plotting conductivity versus concentration of solute at any given temperature, there results a curve which starts out at the low side of conductivity, ascends to one or more peaks and then drops off again. Thus, if the cell is to operate at an exceedingly low temperature, and it is desired to provide maximum conductivity at that temperature, the concentration of solute must be controlled. When the cell is to operate at higher temperatures, such as high atmospheric temperatures or above, it is often desirable to incorporate sufficient solute to raise the boiling point of the electrolyte to above the temperature conditions to which the cell is to be subjected to avoid the use of pressure. Again, when the cell is to operate at exceedingly low temperatures, it will be necessary that the electrolyte remain as a liquid at that operating temperature. For example, with certain molar proportions of ammonium thiocyanate, ammoniated ammonium thiocyanate freezes out. Thus, when operating at these temperatures, the amount of solute employed should be substantially less than that providing, with the ammonia, the ammoniated compound which freezes out at those temperatures. For example, $NH_4SCN \cdot NH_3$ freezes out at about $-20°$ to $-40°$ C., so that a cell designed to operate at this temperature should not have, as its entire electrolyte, a mixture of ammonium thiocyanate and ammonia in a 1:1 molar ratio.

Another factor to be taken into consideration in determining the amount of solute dissolved in the ammonia solvent is the effect of that concentration on the operation of the electrodes. For example, with some anode materials, such as zinc, the anode product, for instance zinc thiocyanate, may precipitate out in the electrolyte at high discharge rates and low temperatures if too much solute is dissolved at the anode region. When such a solid product is formed at the anode region, the anode becomes blocked increasing the internal resistance of the cell, and, in many cases, the anode potential is reduced. Similar consideration is applied to the cathode; however, the nature of the cathode material and/or type of solute will frequently result in different ranges of concentration requirements.

The above-mentioned considerations being borne in mind, the amount of solute, including $-NO_x$-substituted aromatic compound, actually employed may range up to the limits of its solubility in the liquid ammonia at the temperature under consideration. The amount of solute may actually exceed the limits of its solubility in the liquid ammonia. Thus, aside from the questions of optimum conductivity, and of the freezing out of solvated compounds as discussed above, it is not material that excess solute be present.

In order to provide significant current capacity in the cell, it has been found necessary to provide a concentration of solute in the liquid ammonia of at least 1 mol percent. Particularly advantageous results are obtained when the concentration is at least about 2 mol percent. These figures refer to $-NO_x$-substituted aromatic compound plus any other solute employed in conjunction therewith. As to the upper concentration limits for the solute, it is obviously impossible to set a specific figure and say that the compositions on one side are all operable for any purpose and those on the other side are not, since much depends upon the particular solute selected, the nature of the anode and of the cathode, the operating characteristics desired, the temperature and pressure conditions under which the cell is to be operated, and the like, all of which factors must likewise be taken into consideration in conventional aqueous current-producing cell systems. However, as stated above, the amount of solute employed may even exceed its solubility in the ammonia.

For the most part, the foregoing discussion has dealt with the solute broadly and no distinction has been made between the situation where the electrolyte to be formed is uniform throughout and the situation where the electrolyte is formed into two components—the anolyte and the catholyte—in which the anolyte and the catholyte differ as to composition. In certain instances it is desirable that the anolyte, that is the portion of the electrolyte adjacent the anode, and the catholyte, that is the portion of the electrolyte adjacent the cathode, differ from each other as to composition. In such case the solute adjacent the cathode in the cathode section of the cell may differ from the solute adjacent the anode in the anode section of the cell. Where the anolyte and catholyte are to differ, the anode section and the cathode section of the cell compartment may be separated from each other by means of a porous or permeable diaphragm. Even in this case, of course, the anode and the cathode will be in ionic flow relationship. In any event, in accordance with the present invention, $-NO_x$-substituted aromatic compound will be present in the cathode section for contact with the cathode conductor at least some of which will be in dissolved form when the cell contains liquid ammonia or which will be present as such when ammonia is to be added subsequently for activation of the cell.

In one form of cell system in which the anolyte and catholyte differ, the anode comprises an electro-positive metal of the type discussed below, and the solute adjacent the anode comprises a metal salt the cation of which is a metal corresponding to the electro-positive metal of the anode or a metal higher in the electromotive series than the electro-positive metal of the anode, that is, a metal of at least the same level in the electromotive series as the electro-positive metal of the anode; and the solute adjacent the cathode conductor comprises a —NO$_x$-substituted aromatic compound or a —NO$_x$-substituted aromatic compound and, in addition, an ammonium salt and/or a metal salt. In another form of cell system, the preceding elements will be used except that the solute adjacent the anode will be an ammonium salt instead of said metal salt.

In connection with all the foregoing, the present invention may be practiced in accordance with two principal embodiments: (1) a high-drain cell and battery requiring an "acid" electrolyte and (2) a low-drain cell and battery requiring a substantially non-acid electrolyte. In the first embodiment the electrolyte solute, at least adjacent the cathode (the catholyte solute), will contain ammonium ions provided by one or more ammonium compounds as described. In the second embodiment, the electrolyte solute, at least adjacent the cathode, may be only the —NO$_x$-substituted aromatic compound or such compound in conjunction with one or more metal salts as described, and the catholyte will be substantially free of ammonium ions, i.e. will contain not more than about 0.001 mol percent of ammonium ions.

Referring to the electrodes, the anode generally comprises an electro-positive metal. Any metal above iron in the electro-chemical series, particularly lithium, sodium, potassium, caesium, rubidium, calcium, strontium, barium, magnesium, zinc, aluminum, beryllium, manganese, and the like, or mixtures thereof as well as alloys containing one or more of these metals, is suitable. Of the metals, the alkali and alkaline earth metals and zinc, especially lithium, calcium, magnesium, and zinc, particularly, the first, are preferred.

The exact nature of the materials selected as anode will depend upon many factors, including the characteristics desired in the cell. The characteristics desired may dictate the type of electrolyte required, which, in turn, may determine which material should constitute the anode. For example, if high voltage is the criterion, a metal which is highly active, such as lithium, calcium, and the other alkali and alkaline earth metals and alloys containing them, may be selected for the anode. If a moderate voltage is desired, less active of the alkaline earth metals, such as magnesium, and other metals such as manganese, zinc, and alloys containing them, may be selected.

Reference has been made above to the use, as anode, of alloys containing one or more of the metals listed. The alloying of the anode metal with another, less active metal, reduces the availability of the anode metal, and, hence, its chemical activity. Thus, by appropriate selection of alloys containing highly active anode metals alloyed with less active metals, it is possible to employ as anode an alloy containing a highly active metal in situations where the use of that metal by itself would be impractical. Examples of such alloys are lithium aluminum alloys, lithium amalgams, lithium zinc alloys, lithium magnesium alloys, lithium lead alloys, and the like. The anode may also be a paste, a liquid "bronze" of an alkali metal, like lithium, and liquid ammonia as described more fully in Patent 2,863,933.

The cathode conductor may be made up of a conductive material that is inert to the electrolyte such as electrolytic carbon, platinum, boron, zirconium, tantalum, silver, stainless steel, or the like. Of this group, carbon, silver and platinum are preferred materials. However, in applications where carbon is mechanically unsuitable, a conducting protective film may be used to coat and protect a reactive metal cathode conductor.

As stated, another auxiliary depolarizer may be employed in conjunction with the —NO$_x$-substituted aromatic compound in accordance with the present invention and such other depolarizer may be a compound of a metal that possesses a potential in liquid ammonia at least about 0.75 volt less than that provided by the anode metal in liquid ammonia. This metal compound may be soluble, partially soluble or insoluble in the catholyte. Metals, such as iron, manganese, nickel, copper, silver, lead, mercury, and the like, possess relatively low positive potentials or negative potentials. The metal compound employed in conjunction with —NO$_x$-substituted aromatic compound at the cathode may, therefore, be of one of such metals so long as the algebraic difference between its potential in liquid ammonia and the potential of the anode metal in liquid ammonia is at least 0.75 volt. Examples of such metals in the form of compounds serving as depolarizers are manganese dioxide, lead oxide, lead sulfate, lead chloride, lead thiocyanate, silver oxide, silver sulfate, silver hydroxide, silver thiocyanate, silver chloride, mercury sulfate, mercury thiocyanate, and the like.

The design or construction of the cell compartment of the present invention may vary widely depending upon the particular use intended for the cell. The cell may be constructed from a wide variety of relatively cheap and available materials, for example, iron, stainless steel, glass, ceramic material, rubber or synthetic rubber-like materials, synthetic resins, and the like. The material selected, of course, should be chemically resistant to liquid ammonia.

The electrodes may be of any desired shape, such as flat sheets, rods, rolls, cylinders, bobbins, disc, or the like.

The important feature, as far as the present invention is concerned, is to provide, in contact with the cathode conductor at least by the time the cell is to operate, liquid ammonia containing at least one —NO$_x$-substituted aromatic compound. This can be accomplished in a wide variety of ways. For example, the —NO$_x$-substituted aromatic compound may initially be mixed with liquid ammonia, and the resulting mixture fed to the cell or to the cathode section of the cell. The —NO$_x$-substituted aromatic compounds are generally readily soluble in liquid ammonia. On the other hand, the —NO$_x$-substituted aromatic compound as such may be incorporated in the cell, generally in the cathode section and in contact with the cathode conductor, before admission of the ammonia. This is the procedure followed in accordance with the preferred embodiment wherein ammonia is introduced to the cell compartment, at the time of activation, in liquid or vapor form. The addition of the ammonia in vapor form results in the ammonia condensing at the site of the solute, including the —NO$_x$-substituted aromatic compound and reacting with or dissolving the —NO$_x$-substituted aromatic compound and dissolving any other solute.

It is generally desired to render the —NO$_x$-substituted aromatic compound more conductive, and to accomplish this finely-divided conducting material, such as carbon, silver, and the like, may be mixed with the —NO$_x$-substituted aromatic compound. Such conducting material should be substantially insoluble in liquid ammonia. The —NO$_x$-substituted aromatic compound and conducting material may be mixed together in finely-divided form, and may be formed into a paste using an aqueous solution of a salt of the type discussed hereinabove. Such a paste may then be applied to the cathode conductor and dried. The relative proportions of —NO$_x$-substituted aromatic compound to finely-divided conducting material may vary widely, and ratios of the former to the latter as low as 1:10 and as high as 10:1 have been used. Particularly advantageous ratios are from about 1:4 to 6:1.

The amount of —NO$_x$-substituted aromatic compound employed will be dictated largely by the size of the cell and its component and design considerations, all of which is well known to those skilled in the electric current-producing cell art where the same factors are encountered in other "electrode-limited" cell systems.

Figure 2:
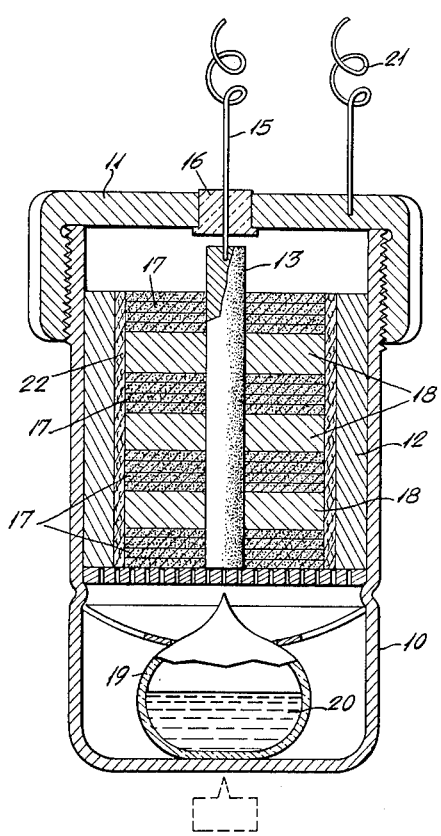
FIGURE 2 represents, schematically, a side elevational, sectional view of another form of cell of the present invention.

Referring then to the drawings, FIGURES 1 and 2, as stated, illustrate schematically cell systems embodying the present invention. The cell of FIGURE 1 comprises a cylindrical glass casing 1, a cathode conductor 2 and an anode 3. Paper separators 4 may or may not be impregnated with a suitable electrolyte salt as described hereinabove. 5 represents a body of —$NO_x$-substituted aromatic compound in contact with cathode conductor 2, and this body —$NO_x$-substituted aromatic compound may consist of a mixture of finely-divided —$NO_x$-substituted aromatic compound and finely-divided inert conducting material such as carbon (graphite). Cathode conductor 2 and anode 3 are provided with suitable conducting wires 6 and 7, respectively. Ports 8 and 9 are provided in casing 1 through which ammonia is admitted, either in liquid form or as a vapor. Where the cell is to be activated through the admission of ammonia, the circuit is completed and ammonia is injected through ports 8 and 9. The ammonia, if admitted in vapor form, condenses in contact with the —$NO_x$-substituted aromatic compound and in contact with any other solute present to dissolve the same thus forming the complete electrolyte and activating the cell. On the other hand, before completing the circuit, the ammonia may be admitted to form the electrolyte, the cell requiring only the completion of the circuit to produce current.

FIGURE 2 illustrates a self-contained, ammonia-vapor-activated unit in which the ammonia is located in a rupturable ampoule in contact with the cell compartment. In this case 10 represents the cell casing, which may be steel or other conductive material, provided with cap 11. 12 represents a magnesium cylinder serving as anode for the cell and 13 represents a carbon rod cathode conductor. Attached to cathode conductor 13 is conductor wire 15 insulated from cap 11 by ceramic sleeve 16. 17 represents porous, e.g. paper, separator discs, which may be impregnated with solute salt, and 18 represents sections of depolarizing material comprising —$NO_x$-substituted aromatic compound, e.g.—$NO_x$-substituted aromatic compound itself, or a mixture of —$NO_x$-substituted aromatic compound and a finely-divided inert conducting material such as carbon. As pointed out previously, solute salt may also be incorporated with the —$NO_x$-substituted aromatic compound or mixture of —$NO_x$-substituted aromatic compound or mixture of —$NO_x$-substituted aromatic compound and conducting material. 19 is a frangible ampoule containing liquid ammonia 20. Conducting wire 21 is attached to cap 11 by which the circuit may be completed. 22 is a porous paper cylinder which may be impregnated with anolyte solute. In operation to activate the cell, ampoule 19 is broken as by pin percussion allowing the liquid ammonia to vaporize. The ammonia vapor permeates the cell including porous separators 17 condensing and dissolving any solute contained therein and also condenses at the site of the —$NO_x$-substituted aromatic compound. The cell is thus activated, and the circuit may be completed to generate current.

Figure 3:
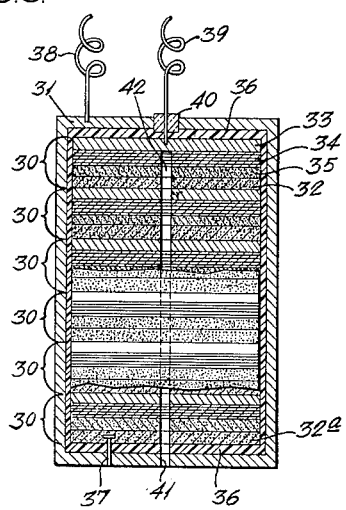
FIGURE 3 illustrates schematically, a side elevational view, partly in section, a form of battery of the invention comprising a plurality of the present cells in a single compartment.

FIGURE 3 illustrates a battery made up of a plurality of individual cells 30 in a single compartment. 31 represents the battery casing which may be of steel or other conducting material. Each cell 30 is made up of a cathode conductor 32, an anode 33, porous, e.g. paper, separator discs 34, which may be impregnated with a solute salt, and a body 35 of deplorazing material comprising —$NO_x$-substituted aromatic compound as previously described. The cells are insulated from casing 31 by means of an insulating layer 36 which may be of a suitable resin or polymer like polyethylene, although the cathode conductor (32a) which is adjacent the bottom of casing 31 is connected electrically to the casing as by wire 37. Lead wire 38 is connected to casing 31, and lead wire 39 is connected to the end anode 33 which is adjacent the top of casing 31, being insulated from casing 31 by insulating sleeve 40. Each of the components of each cell is in electrical contact with the adjacent members and each cell is in electrical contact with each adjacent cell. A port 41 is provided through casing 31 and insulating layer 36 through which ammonia may be admitted to central channel 42. Admission of ammonia through port 41 and into channel 42 results in ammonia permeating the —$NO_x$-substituted aromatic compound body 35 and porous spacers 34 of each cell thereby activating the battery. Current is then generated by completion of the circuit through lead wires 38 and 39.

In the embodiment wherein the cell is activated through the admission of ammonia, it is preferred that the cell compartment, before the addition of the ammonia, be free of moisture, and, preferably, also substantially free of air. Hence, in preparation of the cell in accordance with this embodiment, the cell compartment may be evacuated or flushed with a dry inert gas which is soluble in the ammonia, prior to sealing. The following examples illustrate the preparation and operation of the improved cell system of the present invention, but are not intended to limit the scope of the invention in any way:

Examples I and II illustrate the preparation of low-drain cells using a non-acid electrolyte, and Examples III–XVI illustrate the preparation of high-drain cells using an "acid" electrolyte.

EXAMPLE I

The inner periphery of a magnesium cylinder, 2.4″ high x 1.25″ O.D. (1.13″ I.D.) is lined with a cylinder of drop reaction type paper which has been saturated with a saturated aqueous solution of potassium thiocyanate and dried. A disc of similar salt-impregnated paper is placed across the bottom of the magnesium cylinder. Thirty grams of a dry mixture consisting of 1 part, by weight, of potassium thiocyanate, 1 part of finely-divided carbon and 5 parts of dry m-dinitrobenzene (ground, light yellow flake) are then placed inside the cylinder. A silver rod ⅛″ in diameter is then forced down into the center of the mixture. A further paper disc, as described, is placed across the top of the magnesium cylinder, and the assembly is potted in silicone rubber, ports being provided to permit access of ammonia into the cell, and leads being attached to the silver rod (cathode conductor) and magnesium cylinder (anode). The leads are connected to an ammeter and to a recording voltmeter. The cell is placed in a steel chamber, which is then sealed, evacuated and cooled to −67° to −70° F. Anhydrous liquid ammonia is then forced into the steel chamber, under a pressure of 210 p.s.i.g., to activate the cell.

The peak closed circuit voltage at .025 amp. is 2.0 volts, and it takes 60 hours to reach 90% of the peak closed circuit and 78.5 hours to reach 75% of the peak closed circuit voltage. The drain rate is between .025 and .0235 amperes for the entire run, and the average voltage during the run is 1.9 volts.

The total weight of the cell itself (less potting compound) is 41.5 grams, and the energy output to 75% of peak closed circuit voltage is 3.8 watt-hours.

EXAMPLE II

The inner periphery of a magnesium cylinder 1.44″ high x 0.57″ O.D. (0.51″ I.D.) is lined with a cylinder of drop reaction type paper which has been saturated with a saturated aqueous solution of potassium thiocyanate and dried. A disc of similar salt-impregnated paper is placed across the bottom of the magnesium cylinder. A mixture of 1 part, by weight, of finely-divided carbon and 3 parts of m-dinitrobenzene is tamped into the cylinder. A silver rod ⅛″ in diameter is pushed into the center of the mixture and a paper disc, as described, is placed across the top of the cylinder. Leads are connected to the silver cathode conductor and the magnesium cylinder anode, and the assembly is potted leaving entry ports for access of ammonia into the cell. The leads are connected to an ammeter and to a recording voltmeter and the cell placed in a steel chamber which is then sealed and evacuated. Liquid anhydrous ammonia is then forced into the chamber under 200–300 p.s.i.g. at 77° F. to activate the cell.

The cell discharges at 0.2 ampere constant for about 40 minutes to 75% of peak load voltage. The voltage curve is smooth. The open circuit voltage upon activation is 2.1 volts, dropping to 1.8 volts after 40 minutes of operation.

EXAMPLES III–XVI

A cell is prepared essentially as illustrated in FIGURE 1 of the drawings except that a central aperture ¾" in diameter is provided in the anode, impregnated paper separator or separators, depolarizer composition and cathode conductor through which is placed a polytetrafluoroethylene mandrel with longitudinal grooves in the periphery to permit flow of ammonia between the components. The stated components have a diameter of 1.33". Each paper separator is prepared by impregnating a filter paper pad 1½ mm. thick with a 20% aqueous solution of ammonium thiocyanate and drying. In each case the depolarizer is a combination of an —$NO_x$- substituted aromatic compound and carbon, in a specified ratio, mixed into a paste, with a solution of ammonium thiocyanate as used in impregnating the paper separator, and applied to the cathode conductor followed by drying.

The components of the cells are set forth in Table I below:

*Table I*

| Ex. | Depolarizer | Depolarizer to Carbon Ratio | Anode | Cathode Conductor |
|---|---|---|---|---|
| III | M-dinitrobenzene | 2:1 | Zinc | Stainless Steel. |
| IV | ____do____ | 1:1 | ___do___ | Do. |
| V | ____do____ | 1:2 | ___do___ | Do. |
| VI | 3,5-dinitrobenzoic acid. | 1:1 | ___do___ | Do. |
| VII | ____do____ | 1:3 | ___do___ | Do. |
| VIII | ____do____ | 1:4 | ___do___ | Do. |
| IX | Picric acid | 1:2 | ___do___ | Do. |
| X | 2,4,6-trinitrotoluene | 2:1 | ___do___ | Do. |
| XI | ____do____ | 1:1 | ___do___ | Do. |
| XII | M-dinitrobenzene [1] | 1:1 | ___do___ | Do. |
| XIII | ____do____ | 10:1 | ___do___ | Do. |
| XIV | ____do____ | 1:1 | ___do___ | Bright Platinum. |
| XV | ____do____ | 1:1 | Lithium | Stainless Steel. |
| XVI | N,N-dimethyl-p-nitrosoaniline. | 3:1 | Zinc | Do. |

[1] Two impregnated paper separators used; in all other only one used.

Each cell stack is held, under spring pressure, between stainless steel discs which serve as contacts, and is connected in circuit to an ammeter and voltmeter. The cell is held in a steel chamber into which anhydrous ammonia vapor at 25° C. is admitted for activation. The electrical characteristics of each cell are set forth in the following Table II.

*Table II*

| Cell | Current Density (ma./in.²) | Approx. (Voltage) | $L_{80}$[1] (secs.) |
|---|---|---|---|
| III | 52 | 0.90 | 90 |
| IV | 52 | 0.90 | 300 |
| V | 53 | 0.93 | 75 |
| VI | 50 | 0.87 | 228 |
| VII | 48 | 0.84 | 295 |
| VIII | 40 | 0.69 | 100 |
| IX | 40 | 0.69 | 300 |
| X | 57 | 0.99 | 120 |
| XI | 53 | 0.93 | 44 |
| XII | 117 | 0.66 | 300 |
| XIII | 83 | 0.40 | [2] 60 |
| XIV | 54.3 | 0.94 | 450 |
| XV | 110 | 1.48 | 360 |
| XVI | 120 | 0.62 | 120 |

[1] $L_{80}$=life in seconds to 80% of peak closed circuit voltage.
[2] $L_{60}$=840.

Considerable modification is possible in the selection of the —$NO_x$-substituted organic aromatic compound as well as in the other components of the cell without departing from the scope of the present invention.

I claim:
1. An ammonia electric current-producing cell system comprising an anode of a metal higher in the electrochemical series than ferrous iron, an electrolyte in contact with said anode and consisting essentially of liquid ammonia having material dissolved therein to the extent of at least about 1 mol percent concentration to render said liquid ammonia electrically conductive, a cathode conductor inert to said electrolyte and in contact with said cathode conductor and with said electrolyte, an aromatic organic compound having at least one —$NO_x$ group, where $x$ is an integer selected from the group consisting of 1 and 2, attached directly to the aromatic nucleus.

2. The product of claim 1 wherein said aromatic compound comprises a nitrobenzene.

3. The product of claim 2 wherein said aromatic compound comprises a dinitrobenzene.

4. The product of claim 3 wherein said aromatic compound is selected from the group consisting of m-dinitrobenzene and 3,5-dinitrobenzoic acid.

5. The product of claim 2 wherein said aromatic compound comprises a trinitrobenzene.

6. The product of claim 5 wherein said aromatic compound is selected from the group consisting of picric acid and 2,4,6-trinitrotoluene.

7. The product of claim 1 wherein said organic compound is a nitrosobenzene.

8. The product of claim 7 wherein said aromatic compound is N,N-dimethyl-p-nitrosoaniline.

9. An ammonia electric current-producing cell system comprising an anode of a metal higher in the electrochemical series than ferrous iron, an electrolyte in contact with said anode and consisting essentially of liquid ammonia having material dissolved therein to the extent of at least about 1 mol percent concentration to render said liquid ammonia conductive, a cathode conductor inert to said electrolyte and, in contact with said cathode conductor and said electrolyte, a conductive mixture of an aromatic organic compound having at least one —$NO_x$ group, where $x$ is an integer selected from the group consisting of 1 and 2, attached directly to the aromatic nucleus and finely-divided electrically conductive material.

10. An electric current-producing cell device, comprising an anode of an electropositive metal higher in the electrochemical series than ferrous iron; an anolyte in contact with said anode and consisting essentially of a solution, in liquid ammonia, of at least about 1 mol percent of a salt the cation of which is selected from the group consisting of ammonium and an electropositive metal, a cathode conductor inert to said electrolyte, and, in contact with said cathode conductor and with electrolyte consisting essentially of liquid ammonia having material dissolved therein to the extent of at least about 1 mol percent concentration, an aromatic organic compound having at least one —$NO_x$ group, where $x$ is an integer selected from the group consisting of 1 and 2, attached directly to the aromatic nucleus.

11. The product of claim 9 wherein said aromatic compound has at least two —$NO_x$ groups, wherein $x$ is an integer in each instance separately selected from the group consisting of 1 and 2, attached to non-adjacent ring carbon atoms of the aromatic nucleus.

12. An ammonia-activatable electric current-producing cell device comprising a cell compartment and, within said cell compartment, an anode of an electropositive metal higher in the electrochemical series than ferrous iron, electrolyte solute soluble in liquid ammonia, a cathode conductor inert to a solution of said solute in liquid ammonia and, in contact with said cathode conductor, an aromatic organic compound having at least one —$NO_x$ group, where $x$ is an integer selected from the group consisting of 1 and 2, attached directly to the aromatic nucleus, a reservoir containing liquid ammonia, and a frangible wall separating said ammonia from said cell compartment, the amount of said electrolyte solute and the arrangement of said anode, said electrolyte solute and said aromatic organic compound being such that, upon the rupture of said frangible wall, liquid ammonia dissolves said solute to the extent of at least about 1 mol percent to render said ammonia electrically conductive and the resulting solution contacts said anode and said aromatic organic compound.

13. An ammonia-activatable electric current-producing cell device comprising a cell compartment and, within said cell compartment, an anode of an electropositive metal higher in the electrochemical series than ferrous iron, electrolyte solute free of an electrolyte solvent and comprising a salt the cation of which is selected from the group consisting of ammonium and electropositive metals, a cathode conductor inert to a solution of said solute in liquid ammonia and, in contact with said cathode conductor, an aromatic organic compound having at least one —$NO_x$ group, where $x$ is an integer selected from the group consisting of 1 and 2, attached directly to the aromatic nucleus, and means for introducing ammonia to said compartment comprising a liquid ammonia filled reservoir and a frangible wall separating said ammonia from said cell compartment, the amount of said electrolyte solute and the arrangement of said anode, said electrolyte solute and said aromatic organic compound being such that, upon the rupture of said frangible wall, liquid ammonia dissolves said solute to the extent of at least about 1 mol percent to render said ammonia electrically conductive and the resulting solution contacts said anode and said aromatic organic compound.

14. An ammonia-activatable electric current-producing cell device comprising a cell compartment and within said cell compartment, an anode of an electropositive metal higher in the electrochemical series than ferrous iron, a cathode conductor of a material inert to liquid ammonia and, in contact with said cathode conductor, a conductive mixture of an aromatic organic compound having at least one —$NO_x$ group, where $x$ is an integer selected from the group consisting of 1 and 2, attached directly to the aromatic nucleus and a finely-divided electrically-conductive material, and means for introducing ammonia to said cell compartment comprising a liquid ammonia filled reservoir and a frangible wall separating said ammonia from said cell compartment, said anode and said conductive mixture being so arranged that, upon the rupture of said frangible wall, said liquid ammonia dissolves said aromatic organic compound in an amount to render said liquid amonia electrically conductive and the resulting solution contacts said anode and said conductive mixture.

References Cited by the Examiner

UNITED STATES PATENTS

| 2,937,219 | 5/1960 | Minnick et al. | 136—6 |
| 2,976,342 | 3/1961 | Morehouse et al. | 136—100 |
| 2,996,562 | 8/1961 | Meyers | 136—6 |
| 3,083,252 | 3/1963 | Meyer | 136—90 |

OTHER REFERENCES

Kraus: The Properties of Electrically Conducting Systems, N. Y., 1922, page 314.

WINSTON A. DOUGLAS, *Primary Examiner.*

MURRAY TILLMAN, *Examiner.*